US009742896B2

(12) United States Patent
Lee et al.

(10) Patent No.: US 9,742,896 B2
(45) Date of Patent: Aug. 22, 2017

(54) APPARATUS AND METHOD FOR PROVIDING A NEAR FIELD COMMUNICATION FUNCTION IN A PORTABLE TERMINAL

(71) Applicant: Samsung Electronics Co., Ltd., Suwon-si, Gyeonggi-do (KR)

(72) Inventors: Jae-Hyeok Lee, Bucheon-si (KR); Young-Sin Moon, Suwon-si (KR); Hong-Ju Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 14/147,981

(22) Filed: Jan. 6, 2014

(65) Prior Publication Data
US 2014/0194105 A1    Jul. 10, 2014

(30) Foreign Application Priority Data

Jan. 7, 2013  (KR) .................. 10-2013-0001649
Mar. 13, 2013 (KR) .................. 10-2013-0026964

(51) Int. Cl.
| | | |
|---|---|---|
| *H04M 1/725* | (2006.01) | |
| *H04B 5/00* | (2006.01) | |
| *H04L 29/08* | (2006.01) | |
| *G06F 9/44* | (2006.01) | |
| *H04W 4/00* | (2009.01) | |

(52) U.S. Cl.
CPC ........ *H04M 1/7253* (2013.01); *G06F 9/4405* (2013.01); *H04B 5/0056* (2013.01); *H04L 67/34* (2013.01); *H04M 1/72522* (2013.01); *H04M 1/72525* (2013.01); *H04W 4/008* (2013.01);
(Continued)

(58) Field of Classification Search
CPC .......... H04M 1/7253; H04M 2250/04; H04W 4/008; H04W 4/001; H04W 88/02
See application file for complete search history.

(56) References Cited

U.S. PATENT DOCUMENTS

2001/0034755 A1* 10/2001 Aizono ................... G06F 9/445
  709/201
2008/0132167 A1   6/2008 Bent et al.
(Continued)

FOREIGN PATENT DOCUMENTS

| CN | 1969573 A | 5/2007 | |
|---|---|---|---|
| CN | 102842007 A * | 12/2012 | ............. G06F 21/10 |

(Continued)

*Primary Examiner* — Kashif Siddiqui
*Assistant Examiner* — Minjung Kim
(74) *Attorney, Agent, or Firm* — Jefferson IP Law, LLP

(57) ABSTRACT

An apparatus and a method of providing a Near Field Communication (NFC) function in a portable terminal are provided. The method includes recognizing a tag and reading an NFC message from the tag, storing second data in the memory when the NFC message includes first data of a predetermined record type, the second data corresponding to other data except for the first data among all data included in the NFC message, determining whether a particular application corresponding to the first data has been installed, and when the particular application has been installed, executing the particular application and providing the second data to the particular application so as to enable the particular application to execute a particular function by using the second data.

22 Claims, 11 Drawing Sheets

(52) U.S. Cl.
CPC ........ *H04M 2250/04* (2013.01); *H04W 4/003* (2013.01)

(56) References Cited

U.S. PATENT DOCUMENTS

| | | |
|---|---|---|
| 2008/0254780 A1 | 10/2008 | Kuhl et al. |
| 2010/0178867 A1 | 7/2010 | Charrat |
| 2011/0210831 A1* | 9/2011 | Talty et al. ................. 340/10.51 |
| 2011/0276961 A1 | 11/2011 | Johansson et al. |
| 2012/0322370 A1 | 12/2012 | Lee |
| 2013/0052949 A1* | 2/2013 | Yang .................... H04W 4/001 455/41.1 |
| 2014/0059670 A1* | 2/2014 | Zheng .................... G06F 21/10 726/17 |

FOREIGN PATENT DOCUMENTS

| | | |
|---|---|---|
| EP | 2 405 378 A1 | 1/2012 |
| KR | 10-2010-0075896 A | 7/2010 |
| KR | 10-2011-0089696 A | 8/2011 |
| WO | 2010/077194 A1 | 7/2010 |

* cited by examiner

APPARATUS AND METHOD FOR PROVIDING A NEAR FIELD COMMUNICATION FUNCTION IN A PORTABLE TERMINAL

PRIORITY

This application claims the benefit under 35 U.S.C. §119 (a) of a Korean patent application filed on Jan. 7, 2013 in the Korean Intellectual Property Office and assigned Serial No. 10-2013-0001649, and of a Korean patent application filed on Mar. 13, 2013 in the Korean Intellectual Property Office and assigned Serial No. 10-2013-0026964, the entire disclosure of each of which is hereby incorporated by reference.

BACKGROUND OF THE INVENTION

1. Field of the Invention

The present invention relates to a portable terminal. More particularly, the present invention relates to an apparatus and a method for providing a short-range wireless communication function (e.g., a Near Field Communication (NFC) function) in a portable terminal.

2. Description of the Related Art

A portable terminal, such as a smart phone or a tablet, provides a user with various useful functions through various applications. Therefore, the portable terminal is evolving into a device capable of allowing use of various types of information through the provision of various functions, beyond the voice communication function. Especially, the portable terminal provides an NFC function for providing a data service.

The portable terminal providing an NFC function receives an NFC data exchange format message from a tag, and performs a particular function by using NFC data included in the NFC data exchange format message.

Meanwhile, the NFC data exchange format message may include Android™ Application Record (AAR) type data. When the NFC data exchange format message includes AAR type data and different data other than the AAR type data, the portable terminal processes only the AAR type data by one tagging and cannot process the different data other than the AAR type data.

Therefore, a need exists for an apparatus and a method for simultaneously processing both AAR type data and different data other than the AAR type data at the time of NFC.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for providing a short range wireless communication function (e.g., a Near Field Communication (NFC)) function in a portable terminal, which can simultaneously process both Android™ Application Record (AAR) type data and different data other than the AAR type data at the time of communication (e.g., NFC).

In accordance with an aspect of the present invention, an apparatus for providing a short range wireless communication function, e.g., an NFC function, in a portable terminal is provided. It will be appreciated that "short range" in the context of this specification means a range of no more than 1 m, e.g., a range up to 50 cm, 40 cm, 30 cm, 20 cm, 10 cm or even shorter (with ranges up to 10 or 20 cm being those commonly associated with communication technology typically described as NFC technology). The apparatus includes a communication unit, which may also be described as a short range communication unit, e.g., an NFC unit, for recognizing a tag and reading a message (e.g., an NFC message) from the tag wirelessly, a memory, and a controller for storing second data in the memory when the message (e.g., NFC message) includes first data of a predetermined record type, the second data corresponding to other data except for the first data among all data included in the message (e.g., NFC message), for determining whether an application corresponding to the first data has been installed, for executing the application when the application has been installed, and for providing the second data to the application so as to enable the application to execute a function using the second data.

In accordance with another aspect of the present invention, a method of providing a short range wireless communication function (e.g., an NFC function) in a portable terminal is provided. The method includes recognizing a tag and reading a message (e.g., an NFC message) from the tag, storing second data in the memory when the message (e.g., NFC message) includes first data of a predetermined record type, the second data corresponding to other data except for the first data among all data included in the message (e.g., NFC message), determining whether an application corresponding to the first data has been installed, and when the application has been installed, executing the application and providing the second data to the application so as to enable the application to execute a function using the second data.

In accordance with another aspect of the present invention, an apparatus for providing a short range wireless communication function (e.g., an NFC function) in a portable terminal is provided. The apparatus includes a communication unit (e.g., a short range wireless communication unit, such as an NFC unit) for wirelessly recognizing a tag and reading a message (e.g., an NFC message) from the tag, a memory for storing a name of at least one application, and a controller for detecting information with the at least one application from a message (e.g., NFC message) when a package included in data of a record type included in the message (e.g., NFC message) is the name of the at least one application, storing the detected information, executing the at least one application, and providing the detected information to the at least one application so as to enable the at least one application to execute a function using the detected information.

In accordance with another aspect of the present invention, a method of providing a short range wireless communication function (e.g., an NFC function) in a portable terminal is provided. The method includes recognizing a tag and reading a message (e.g., an NFC message) from the tag, detecting information associated with at least one application from the message (e.g., NFC message) and storing the detected information when a package included in data of a record type included in the message (e.g., NFC message) is the name of the at least one application, and executing the at least one application and providing the detected information to the at least one application so as to enable the at least one application to execute a function using the detected information.

An apparatus and a method for providing a short range wireless communication function (e.g., an NFC function) in a portable terminal according to the present invention can simultaneously process both the AAR type data and different data other than the AAR type data at the time of short range wireless communication (e.g., NFC).

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A portable terminal according to an exemplary embodiment of the present invention is an electronic device which is easy to carry, and may be a video phone, a portable phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an Electronic-Book (E-Book), a portable computer, such as a laptop, a tablet, a digital camera, or the like.

Figure 1A:
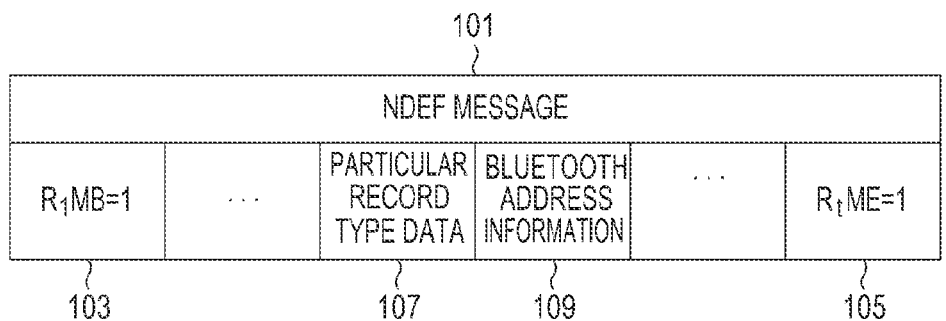
FIGS. 1A and 1B illustrate a Near Field Communication (NFC) data exchange format according to the related art.
Figure 1B:
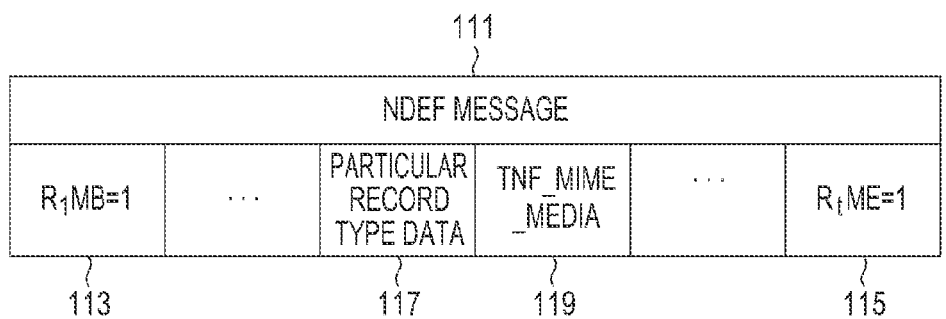

FIGS. 1A and 1B illustrate a Near Field Communication (NFC) data exchange format according to the related art.

Referring to FIGS. 1A and 1B, a first NFC Data Exchange Format (NDEF) message 101 and a second NDEF message 111 are illustrated.

Each of the first NDEF message 101 and the second NDEF message 111 includes at least one NFC record and each NFC record includes various types of data. The first NDEF message 101 includes a first record 103, a second record 107, a third record 109, and a $t^{th}$ record 105. The first record 103 includes an identifier (MB=1) indicating the beginning of the first NDEF message 101, and the $t^{th}$ record 105 includes an identifier (ME=1) indicating the termination of the first NDEF message 101. Further, the second record 107 includes data of a predetermined record type. Here, the predetermined record type refers to a record type for execution or downloading of a particular application. For example, when an operating system of a portable terminal is Android™, the predetermined record type may be an Android™ Application Record (AAR) type. Further, the third record 109 includes Bluetooth™ address information. Especially, by the predetermined record type, it is possible to determine whether a particular package (name of a particular application) included in data of the predetermined record type has been installed in the portable terminal.

The second NDEF message 111 includes a first record 113, a second record 117, a third record 119, and a $t^{th}$ record 115. The first record 113 includes an identifier (MB=1) indicating the beginning of the second NDEF message 111, and the $t^{th}$ record 115 includes an identifier (ME=1) indicating the termination of the second NDEF message 111. Further, the second record 117 includes data of a predetermined record type, and the third record 119 includes data of TNF_MIME_MEDIA or TNF_WELL_KNOWN type. Here, when the data of TNF_MIME_MEDIA or TNF_WELL_KNOWN type includes a particular package and data and an application corresponding to the particular package has been set to receive the data of TNF_MIME_MEDIA or TNF_WELL_KNOWN type, the portable terminal provides data to the application so that the application uses the data included in the TNF_MIME_MEDIA or TNF_WELL_KNOWN type data.

Figure 2:
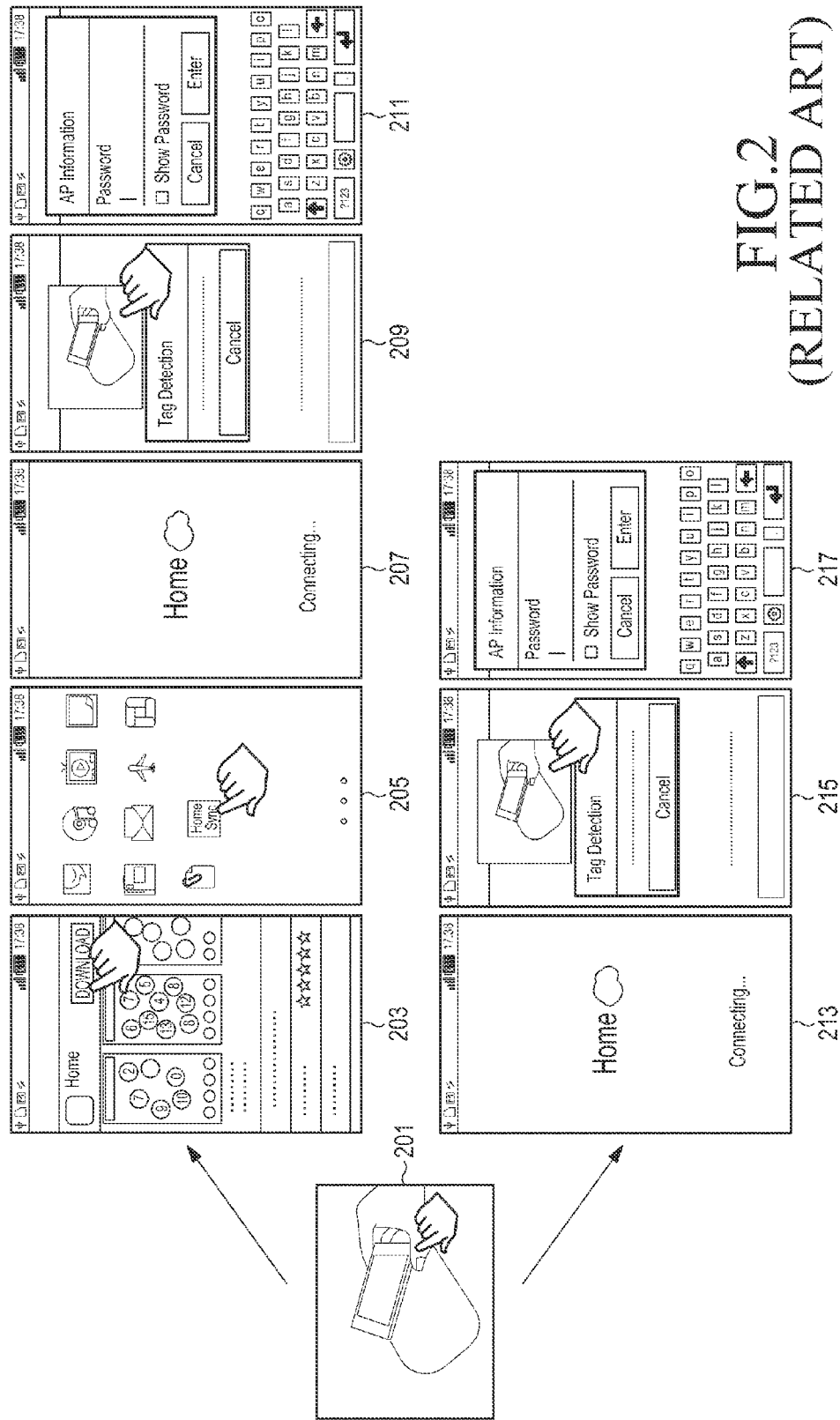
FIG. 2 illustrates a screen providing an NFC function in a portable terminal according to the related art.

FIG. 2 illustrates a screen providing an NFC function in a portable terminal according to the related art.

Now, an operation of a portable terminal when it has received the first NDEF message 101 is described with reference to FIG. 2.

Referring to FIG. 2, it is illustrated in a screen 201 that, when the portable terminal is made to come into contact with a tag by a user, the portable terminal reads data stored in the tag. In this event, it is assumed that the data stored in the tag is the first NDEF message 101. Further, the portable terminal analyzes the read first NDEF message 101. When the read first NDEF message 101 includes predetermined record type data, the portable terminal disregards other data except for the predetermined record type data and identifies a particular package included in the predetermined record type data. Further, the portable terminal determines whether a particular application corresponding to the identified particular package has been installed. In this event, it is assumed that the particular application is a Home application.

As a result of the determination in the screen 201, when the Home application is not installed, as shown in a screen 203, the portable terminal connects to a download link in which it is possible to download the Home application, and displays the download screen. When downloading of the Home application is requested by the user, the portable terminal downloads and installs the Home application as shown in a screen 205. Further, when execution of the Home application is requested by the user, the portable terminal executes the Home application as shown in a screen 207. As shown in a screen 209, the portable terminal displays a screen requesting the user to make the portable terminal come into contact with the tag again. When the portable terminal has been made to come into contact with the tag again by the user, the portable terminal reads and analyzes the first NDEF message 101, to detect a Bluetooth™ address information. Thereafter, as shown in a screen 211, the portable terminal connects a Bluetooth™ communication by using the detected Bluetooth™ address information, and displays a screen requesting the user to input a password for authentication of the user.

As a result of the determination in the screen 201, when the Home application has been installed, as shown in a screen 213, the portable terminal automatically executes the Home application. As shown in a screen 215, the portable terminal displays a screen requesting the user to make the portable terminal come into contact with the tag again. When the portable terminal has come into contact with the tag again, the portable terminal reads and analyzes the first NDEF message 101, to detect a Bluetooth™ address information. Thereafter, as shown in a screen 217, the portable terminal connects a Bluetooth™ communication by using the detected Bluetooth™ address information, and displays a screen requesting the user to input a password for authentication of the user.

As described above, when the portable terminal reads the first NDEF message 101, the portable terminal first processes predetermined record type data included in the first NDEF message 101 while disregarding other data except for the predetermined record type data. Therefore, the portable terminal is unable to simultaneously process the predetermined record type data and Bluetooth™ address information by one tagging. Further, when the portable terminal also reads the second NDEF message 111 from the tag, the portable terminal first processes predetermined record type data included in the second NDEF message 111 while disregarding other data except for the predetermined record type data. Therefore, the portable terminal is unable to simultaneously process the predetermined record type data and TNF_MIME_MEDIA or TNF_WELL_KNOWN type data by one tagging.

Figure 3:
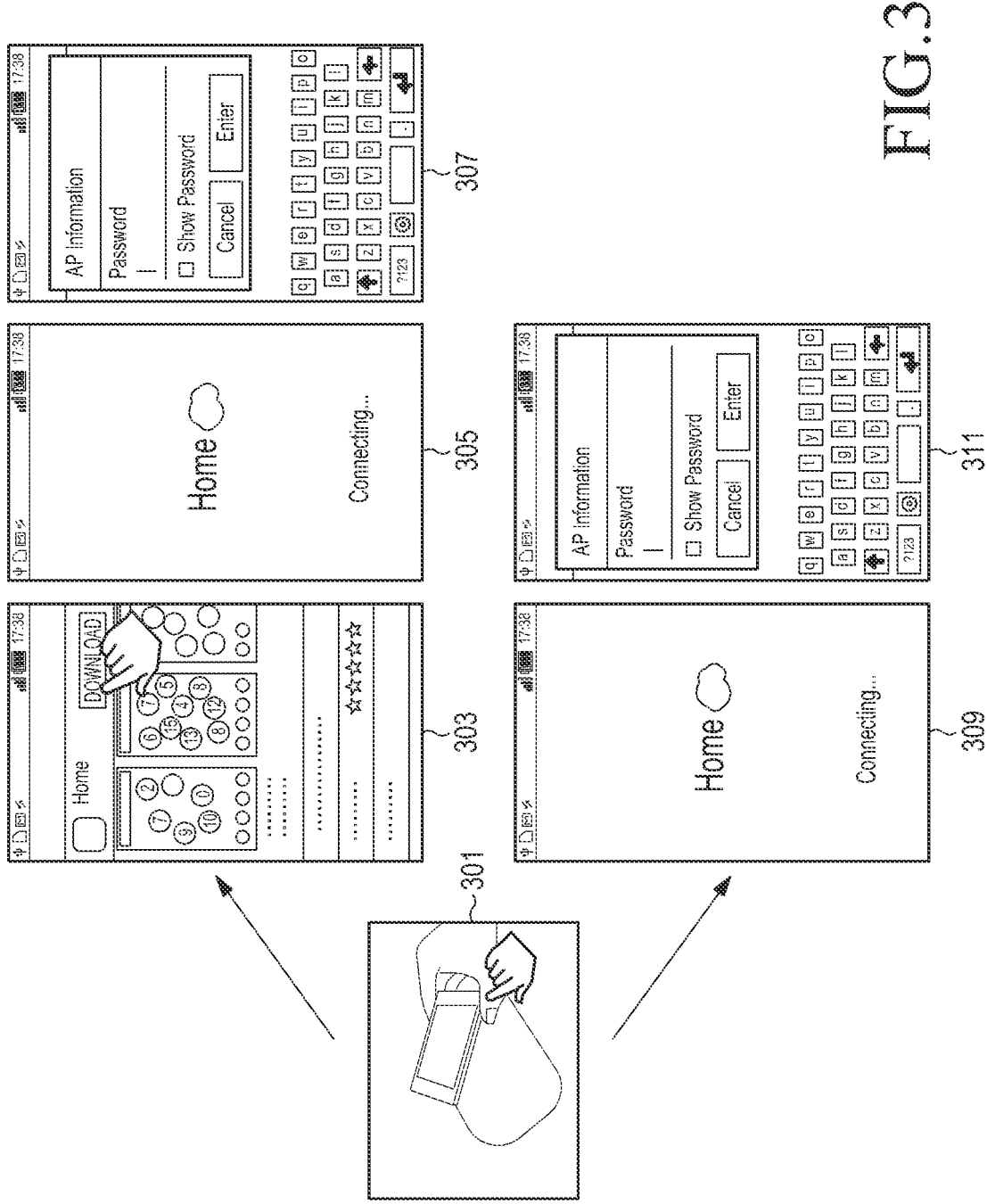
FIG. 3 illustrates a screen providing a short range wireless communication function (in particular, an NFC function) in a portable terminal according to an exemplary embodiment of the present invention.

FIG. 3 illustrates a screen providing an NFC function in a portable terminal according to an exemplary embodiment of the present invention. By addressing the problems described above with reference to FIG. 2, an exemplary embodiment of the present invention provides an operation process as described below.

Referring to FIG. 3, it is illustrated in a screen 301 that, when the portable terminal is made to come into contact with a tag by a user, the portable terminal reads data stored in the tag. In this event, it is assumed that the data stored in the tag is the first NDEF message 101. Further, the portable terminal analyzes the read first NDEF message 101. When the read first NDEF message 101 includes predetermined record type data, the portable terminal stores other data except for the predetermined record type data and identifies a particular package included in the predetermined record type data. Further, the portable terminal determines whether a particular application corresponding to the identified particular package has been installed. In this event, it is assumed that the particular application is a Home application.

As a result of the determination in the screen 301, when the Home application is not installed, as shown in a screen 303, the portable terminal connects to a download link in which it is possible to download the Home application, and displays the download screen. When downloading of the Home application is requested by the user, the portable terminal downloads, installs, and automatically executes the Home application as shown in a screen 305. Further, as shown in a screen 307, the portable terminal connects a Bluetooth™ communication by using the Bluetooth™ address information, which is stored data, and displays a screen requesting the user to input a password for authentication of the user.

As a result of the determination in the screen 301, when the Home application has been installed, as shown in a screen 309, the portable terminal automatically executes the Home application. Thereafter, as shown in a screen 311, the portable terminal connects a Bluetooth™ communication by using the detected Bluetooth™ address information, which is stored data, and displays a screen requesting the user to input a password for authentication of the user.

As described above, when the portable terminal reads an NDEF message including predetermined record type data and other data except for the predetermined record type data, the portable terminal can store the other data except for the predetermined record type data included in the NDEF message, process the predetermined record type data, and automatically execute the following operation by using the stored data.

Figure 4:
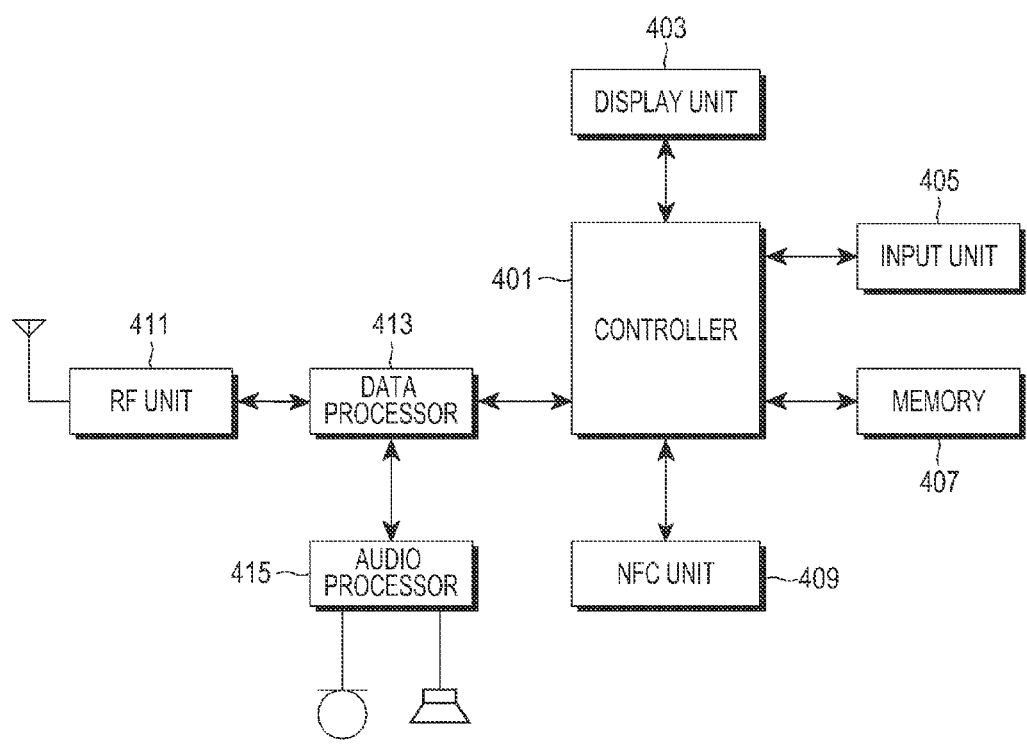
FIG. 4 is a block diagram illustrating a construction of a portable terminal according to an exemplary embodiment of the present invention.

FIG. 4 is a block diagram illustrating a construction of a portable terminal according to an exemplary embodiment of the present invention.

Referring to FIG. 4, the portable terminal includes a controller 401, a display unit 403, a memory 407, an input unit 405, an NFC unit 409, a Radio Frequency (RF) unit 411, a data processor 413, and an audio processor 415.

The RF unit 411 performs a wireless communication function of a portable terminal. Specifically, the RF unit 411 includes a wireless transmitter for up-converting an outgoing signal and amplifying the frequency of the outgoing signal and a wireless receiver for low-noise-amplifying an incoming signal and down-converting the frequency of the incoming signal. Further, the data processor 413 includes a transmitter for encoding and modulating an outgoing signal and a receiver for demodulating and decoding an incoming signal. The data processor 413 may be configured by a modem and a COder-DECoder (CODEC), and the CODEC may include a data CODEC for processing packet data, and the like, and an audio CODEC for processing an audio signal, such as a voice.

Further, the audio processor 415 reproduces a received audio signal output from the data processor 413 through a speaker or transmits an outgoing audio signal generated by a microphone. Further, the input unit 405 includes keys for input of numbers and character information and functional keys for setting of various functions, and the display unit 403 displays an image signal through a screen and displays data, output of which is requested by the controller 401.

If the display unit 403 is implemented in a touch display screen type, such as a capacitive type or a resistive type, the input unit 405 may include preset minimum keys and the display unit 403 may partly replace the key input function of the input unit 405. Further, the memory 207 includes a program memory and a data memory. The program memory stores a booting and Operating System (OS) for controlling general operations of a portable terminal, and the data memory stores a variety of data generated during the operation of the portable terminal.

Further, under the control of the controller 401, the NFC unit 409 reads an NDEF message from a tag and outputs the read NDEF message to the controller 401. Especially, the NFC unit 409 may read an NDEF message including predetermined record type data and the other data except for the predetermined record type data from a tag. The predetermined record type refers to a record type for execution or downloading of a particular application. For example, when an OS of a portable terminal is Android™, the predetermined record type may be an AAR type.

Further, the controller 401 controls the general operation of a portable terminal. Especially, in a first exemplary embodiment of the present invention, the controller 401 recognizes a tag by using the NFC unit 409 and reads an NDEF message from the tag. Further, the controller 401 analyzes the read NDEF message to determine whether the NDEF message includes predetermined record type data. As a result of the determination, when the NDEF message does not include predetermined record type data, the controller 401 performs a particular function according to corresponding data included in the NDEF message.

In contrast, when the NDEF message includes predetermined record type data, the controller 401 stores the predetermined record type data included in the NDEF message in the memory 407. In this event, the controller 401 may store the NDEF message in a data area of the memory 407. Further, the controller 401 identifies a particular package included in the predetermined record type data and determines whether a particular application corresponding to the identified particular package has been installed in the portable terminal.

As a result of the determination, when the particular application has not been installed in the portable terminal, the controller 401 connects to a download link at which it is possible to download the particular application and displays a download screen. Further, the controller 401 determines whether downloading of the particular application is requested by the user. As a result of the determination, when downloading of the particular application is requested, the controller 401 downloads and installs the particular application.

When the particular application is either downloaded and installed or previously installed, the controller 401 automatically executes the particular application. Further, the controller 401 provides the other data except for the stored predetermined record type data to the particular application, so as to enable the particular application to perform a particular function by using other data except for the stored predetermined record type data. For example, when the other data except for the stored predetermined record type data is Bluetooth™ address information, the controller 401 controls to connect the particular application to the Bluetooth™ communication based on the Bluetooth™ address information.

In a second exemplary embodiment of the present invention, the controller 401 recognizes a tag by using the NFC unit 409 and reads an NDEF message from the tag. Further, the controller 401 analyzes the read NDEF message to determine whether the NDEF message includes AAR type data.

As a result of the determination, when the NDEF message does not include AAR type data, the controller 401 performs a particular function according to corresponding data included in the NDEF message. In contrast, when the NDEF message includes AAR type data, the controller 401 analyzes the AAR type data to identify a particular package included in the AAR type data, and determines whether the identified particular package corresponds to at least one pre-stored particular application name. For example, since the particular application is an application providing the Bluetooth™ function, the particular application name may be stored in advance in the memory 407.

As a result of the determination, when the particular package is a particular application name, the controller 401 detects particular information from the NDEF message and stores the detected particular information in the memory 407. The particular information refers to information relating to the particular application corresponding to the particular package among the data included in the NDEF message. For example, the particular information may be Bluetooth™ (BT) information and the BT information includes a Bluetooth™ address for connection of a Bluetooth™ communication with an external device. In this event, the controller 401 may store particular information in a data area of the memory 407.

In addition, the controller 401 determines whether the particular application corresponding to the particular package has been installed in the portable terminal. As a result of the determination, when the particular application has not been installed, the controller 401 connects to a download link at which it is possible to download the particular application and displays a download screen. Further, the controller 401 determines whether downloading of the particular application is requested by the user. As a result of the determination, when downloading of the particular application is requested, the controller 401 downloads and installs the particular application.

When the particular application has been installed, the controller 401 automatically executes the particular application. Further, the controller 401 provides stored particular information to the particular application, so as to enable the particular application to perform a particular function by using the stored particular information. For example, when the particular information is BT information, the controller 401 controls to enable the particular application to perform Bluetooth™ communication with an external device supporting the Bluetooth™ communication based on the BT information.

Figure 5:
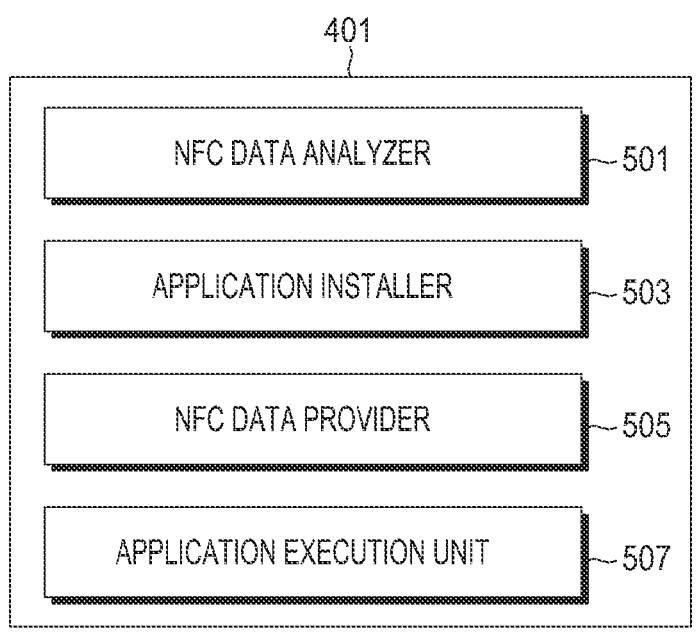
FIG. 5 is a block diagram illustrating a construction of a controller according to an exemplary embodiment of the present invention.

FIG. 5 is a block diagram illustrating a construction of a controller according to an exemplary embodiment of the present invention.

Referring to FIG. 5, the controller 401 includes an NFC data analyzer 501, an application installer 503, an NFC data provider 505, and an application execution unit 507.

In a first exemplary embodiment of the present invention, the NFC data analyzer 501 receives an NDEF message and analyzes the received NDEF message to determine whether the NDEF message includes predetermined record type data. As a result of the determination, when the NDEF message does not include predetermined record type data, the NFC data analyzer 501 performs a corresponding function according to data included in the NDEF message.

In contrast, when the NDEF message includes predetermined record type data, the NFC data analyzer 501 stores the other data except for the predetermined record type data included in the NDEF message. Further, the NFC data analyzer 501 identifies a particular package included in the predetermined record type data and determines whether a particular application corresponding to the identified particular package has been installed in the portable terminal.

As a result of the determination, when the particular application has not been installed in the portable terminal, the NFC data analyzer 501 requests the application installer 503 to install the particular application. In contrast, when the particular application has been installed in the portable terminal, the NFC data analyzer 501 transmits an application installation message indicating that the particular application has been installed to the NFC data provider 505.

In the second exemplary embodiment, the NFC data analyzer 501 receives an NDEF message from the NFC unit 409 and analyzes the received NDEF message to determine whether the received NDEF message includes AAR type data. As a result of the determination, when the NDEF message includes AAR type data, the NFC data analyzer 501 analyzes the AAR type data to identify a particular package included in the AAR type data.

Further, the NFC data analyzer 501 determines whether the identified particular package corresponds to at least one pre-stored particular application name. The particular application may be an application providing a Bluetooth™ function, and the particular application name may be stored in advance in the memory 407.

As a result of the determination, when the particular package is a particular application name, the NFC data analyzer 501 detects particular information from the NDEF message and stores the detected particular information in the memory 407. Further, the NFC data analyzer 501 determines whether the particular application corresponding to the particular package has been installed in the portable terminal.

As a result of the determination, when the particular application has not been installed, the NFC data analyzer 501 requests the application installer 503 to install the particular application. When the particular application has been installed, the NFC data analyzer 501 transmits an application installation message indicating that the particular application has been installed to the NFC data provider 505.

Further, in the first and second exemplary embodiments of the present invention, when there is a request for an installation of a particular application from the NFC data analyzer 501, the application installer 503 connects to a download link in which it is possible to download the particular application, and displays a download screen. When downloading of the particular application is requested by the user, the application installer 503 downloads and installs the particular application, and transmits an application installation message indicating that the particular application has been installed to the NFC data provider 505.

Further, in the first exemplary embodiment of the present invention, when the NFC data provider 505 has received an application installation message from the NFC data analyzer 501 or the application installer 503, the NFC data provider 505 detects stored data, generates a first application execution request message including a particular package and the stored data, and transmits the generated first application execution request message to the application execution unit 507. The application execution request message corresponds to a message requesting execution of a particular application.

In addition, in the second exemplary embodiment of the present invention, when the NFC data provider 505 has received an application installation message from the NFC data analyzer 501 or the application installer 503, the NFC data provider 505 detects particular information stored in the NFC unit 409. Further, the NFC data provider 505 generates a second application execution request message including a particular package and the stored particular information, and transmits the generated second application execution request message to the application execution unit 507.

In addition, in the first exemplary embodiment of the present invention, the application execution unit 507 receives a first application execution request message, executes a particular application corresponding to a particular package included in the received first application execution request message, and provides data included in the application execution request message to the executed particular application, so as to enable the particular application to perform a particular function by using the provided data. For example, when the provided data is Bluetooth™ address information, the particular application may connect to Bluetooth™ communication based on the Bluetooth™ address information.

In addition, in the second exemplary embodiment of the present invention, the application execution unit 507 receives a second application execution request message, executes a particular application corresponding to a particular package included in the received second application execution request message. Further, the application execution unit 507 provides particular information included in the application execution request message to the executed particular application, so as to enable the particular application to perform a particular function by using the provided particular information. For example, when the particular information is BT information, the application execution unit 507 may control to enable the particular application to perform Bluetooth™ communication with an external device supporting the Bluetooth™ communication based on the particular information.

Figure 6:
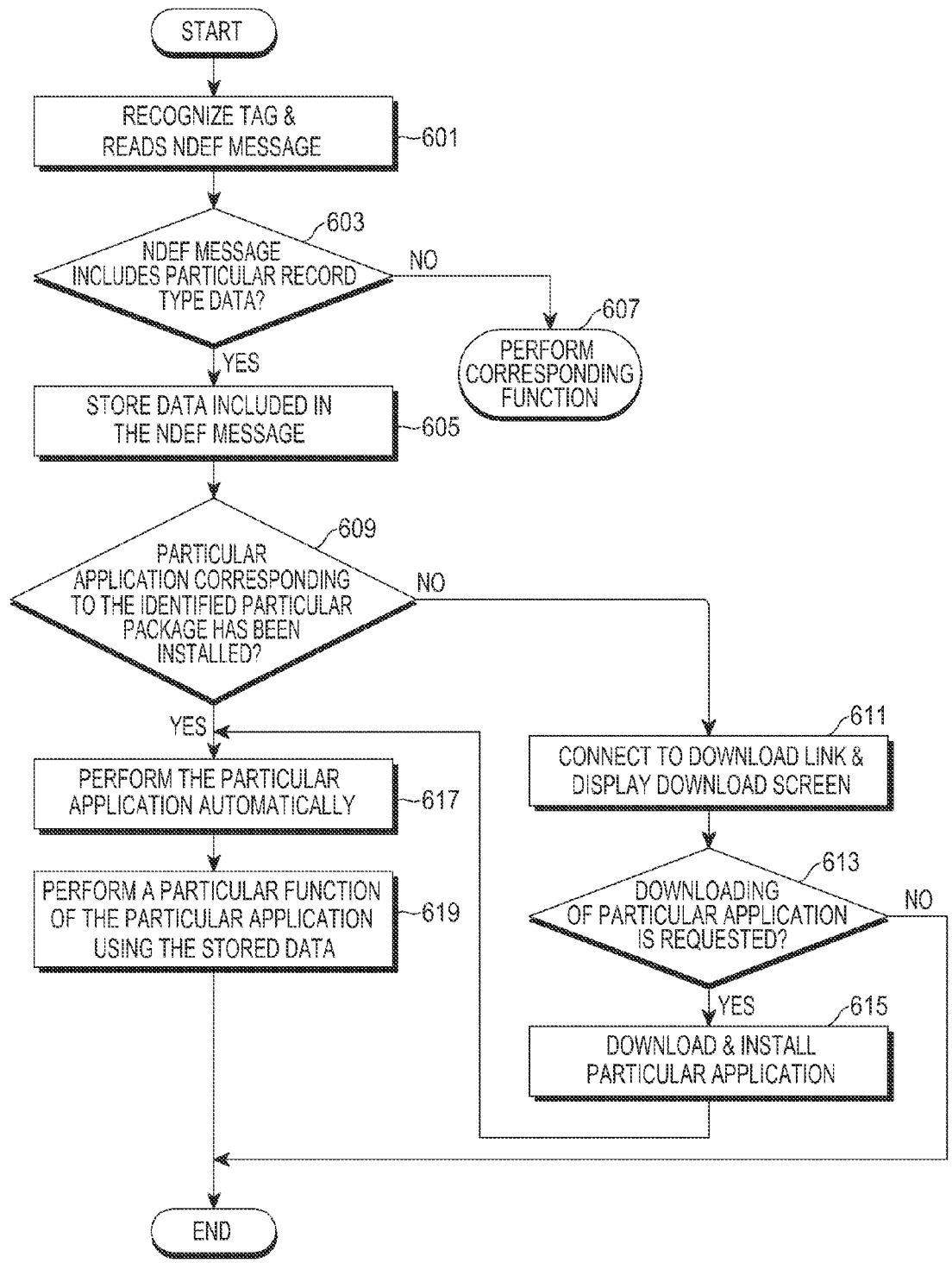
FIG. 6 illustrates a flowchart of a process of providing an NFC function by a portable terminal according to a first exemplary embodiment of the present invention.

FIG. 6 illustrates a flowchart of a process of providing an NFC function by a portable terminal according to the first exemplary embodiment of the present invention.

Referring to FIG. 6, in step 601, the controller 401 recognizes a tag by using the NFC unit 409 and reads an NDEF message from the tag, and proceeds to step 603. In step 603, the controller 401 analyzes the read NDEF message to determine whether the NDEF message includes predetermined record type data. The predetermined record type refers to a record type for execution or downloading of a particular application. For example, when an operating system of a portable terminal is Android™, the predetermined record type may be an AAR type.

As a result of the determination, when the NDEF message does not include predetermined record type data, the controller 401 proceeds to step 607. Otherwise, the controller 401 proceeds to step 605. In step 607, the controller 401 performs a particular function according to a corresponding data included in the NDEF message.

In contrast, in step 605, the controller 401 stores data included in the NDEF message in the memory 407, and proceeds to step 609. In this event, the controller 401 may store the NDEF message in a data area of the memory 407. In step 609, the controller 401 identifies a particular package included in the predetermined record type data and determines whether a particular application corresponding to the identified particular package has been installed in the portable terminal. As a result of the determination, when the particular application has not been installed in the portable terminal, the controller 401 proceeds to step 611. Otherwise, the controller 401 proceeds to step 617.

In step 611, the controller 401 connects to a download link at which it is possible to download the particular application and displays a download screen. Further, in step 613, the controller 401 determines whether downloading of the particular application is requested by the user. As a result of the determination, when downloading of the particular application is requested, the controller 401 proceeds to step 615. Otherwise, the controller 401 terminates the process of providing the NFC function.

In step 615, the controller 401 downloads and installs the particular application, and proceeds to step 617. In step 617, the controller 401 automatically executes the particular application, and proceeds to step 619. In step 619, the controller 401 provides the other data except for the stored predetermined record type data to the particular application, so as to enable the particular application to perform a particular function by using the other data except for the stored predetermined record type data. For example, when the other data except for the stored predetermined record type data is Bluetooth™ address information, the controller 401 controls to connect the particular application to the Bluetooth™ communication based on the Bluetooth™ address information.

Figure 7A:
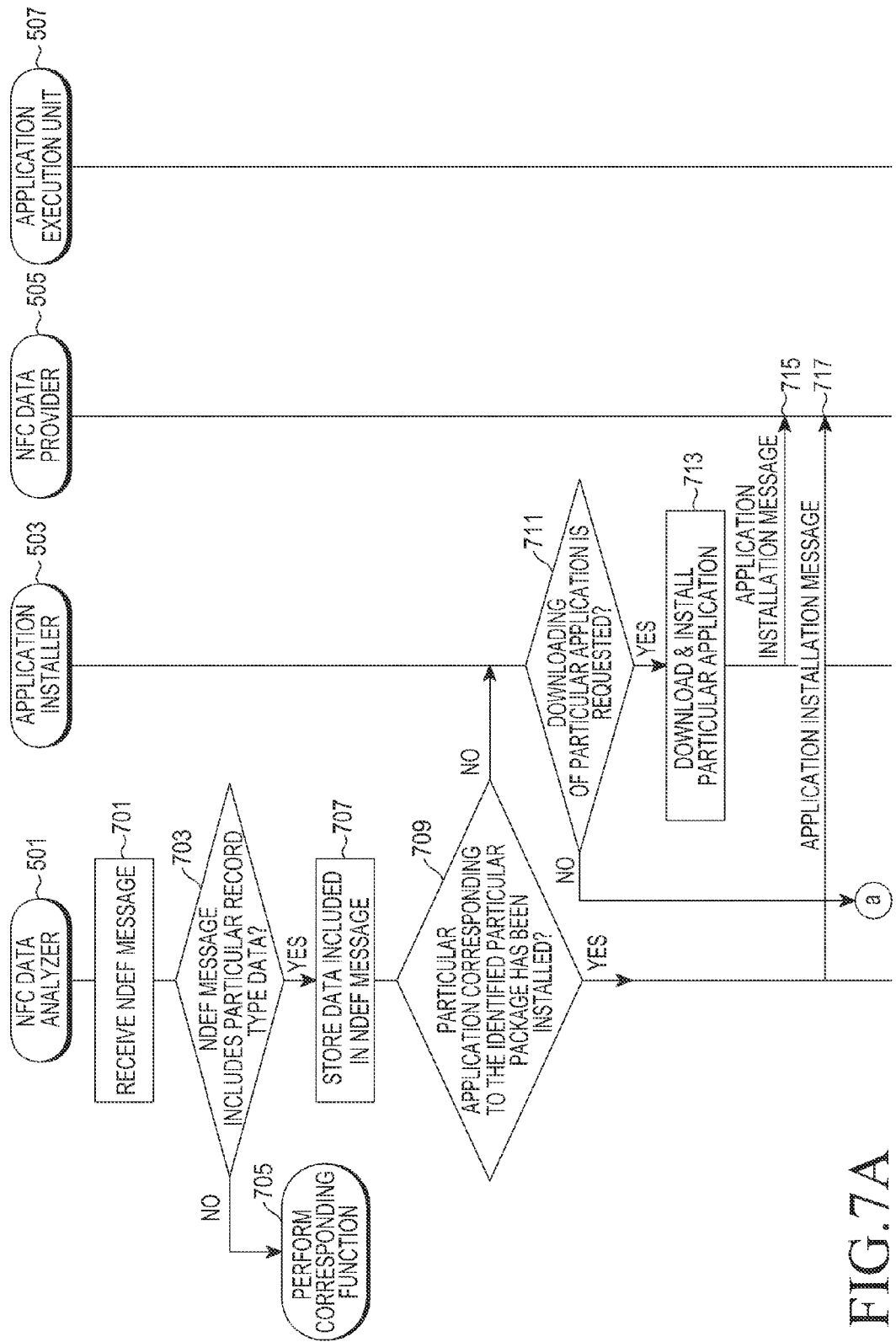
FIGS. 7A and 7B illustrate a flowchart of a process of providing an NFC function by a controller according to the first exemplary embodiment of the present invention.
Figure 7B:
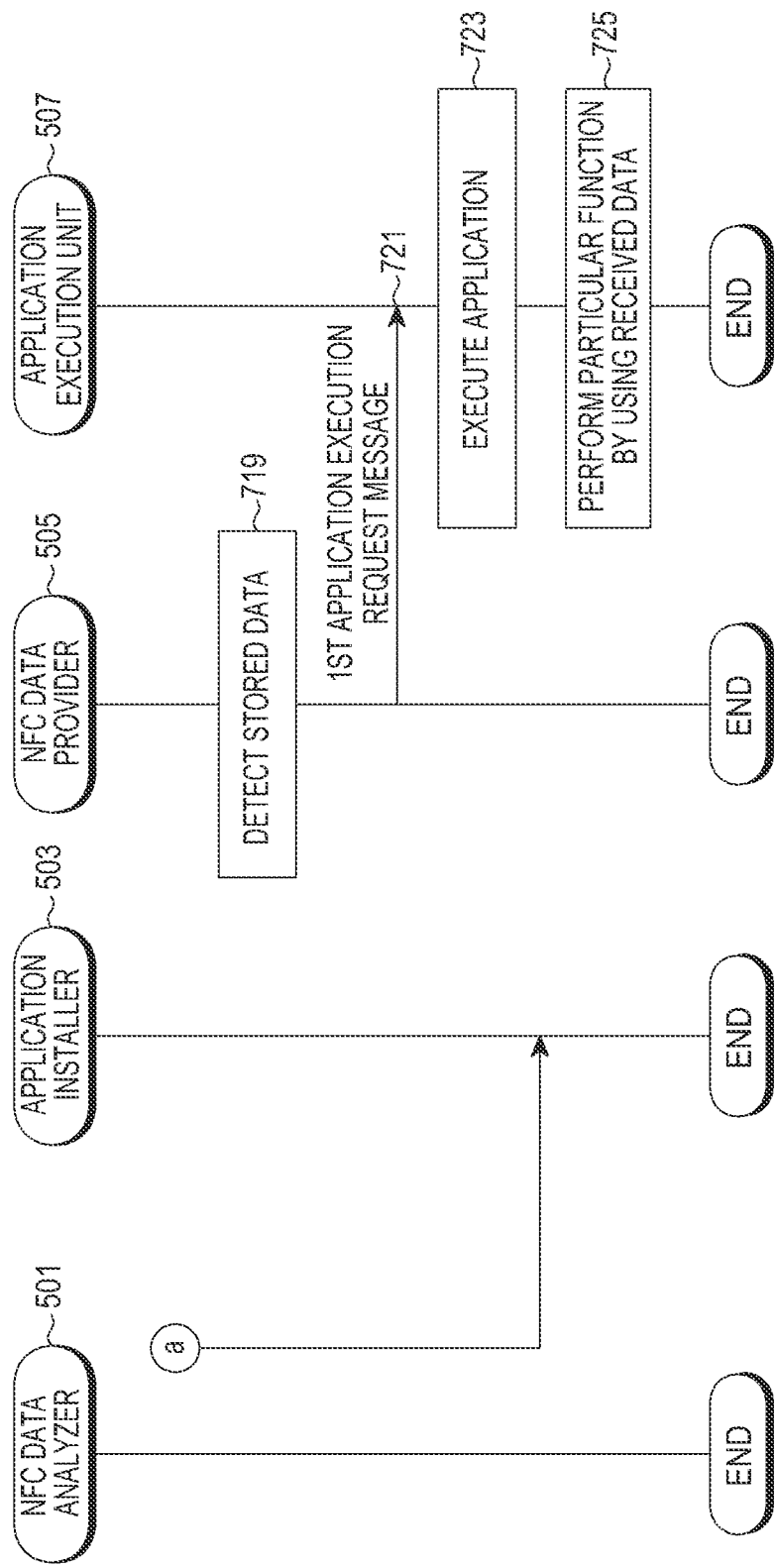

FIGS. 7A and 7B illustrate a flowchart of a process of providing an NFC function by a controller according to the first exemplary embodiment of the present invention.

Referring to FIGS. 7A and 7B, in step 701, the NFC data analyzer 501 receives an NDEF message. Thereafter, in step 703, the NFC data analyzer 501 analyzes the received NDEF message to determine whether the NDEF message includes predetermined record type data. As a result of the determination, when the NDEF message does not include predetermined record type data, the NFC data analyzer 501 proceeds to step 705. Otherwise, the NFC data analyzer 501 proceeds to step 707. In step 705, the NFC data analyzer 501 performs a corresponding function according to data included in the NDEF message.

In contrast, in step 707, the NFC data analyzer 501 stores other data except for the predetermined record type data included in the NDEF message. Further, in step 709, the NFC data analyzer 501 identifies a particular package included in the predetermined record type data by analyzing the predetermined record type data and determines whether a particular application corresponding to the identified particular package has been installed in the portable terminal.

As a result of the determination, when the particular application has not been installed in the portable terminal, the NFC data analyzer 501 proceeds to step 711 in order to request the application installer 503 to install the particular application. Otherwise, the NFC data analyzer 501 proceeds to step 717.

In step 717, the NFC data analyzer 501 transmits an application installation message indicating that the particular application has been installed to the NFC data provider 505, and proceeds to step 719.

In step 711, the application installer 503 connects to a download link in which it is possible to download the particular application, and displays a download screen. When downloading of the particular application is requested by the user, the application installer 503 proceeds to step 713. Otherwise, the application installer 503 terminates the process of providing the NFC function.

In step 713, the application installer 503 downloads and installs the particular application. In step 715, the application installer 503 transmits an application installation message indicating that the particular application has been installed to the NFC data provider 505, and proceeds to step 719.

Thereafter, in step 719, the NFC data provider 505 detects stored data. In step 721, the NFC data provider 505 generates a first application execution request message including a particular package and the stored data and transmits the generated first application execution request message to the application execution unit 507, and proceeds to step 723. The application execution request message corresponds to a message requesting execution of a particular application.

In step 723, the application execution unit 507 receives the first application execution request message and executes a particular application corresponding to the particular package included in the received first application execution request message, and proceeds to step 725. In step 725, the application execution unit 507 provides data included in the application execution request message to the executed particular application, so as to enable the particular application to perform a particular function by using the provided data. For example, when the provided data is Bluetooth™ address information, the particular application may connect to Bluetooth™ communication based on the Bluetooth™ address information.

Figure 8:
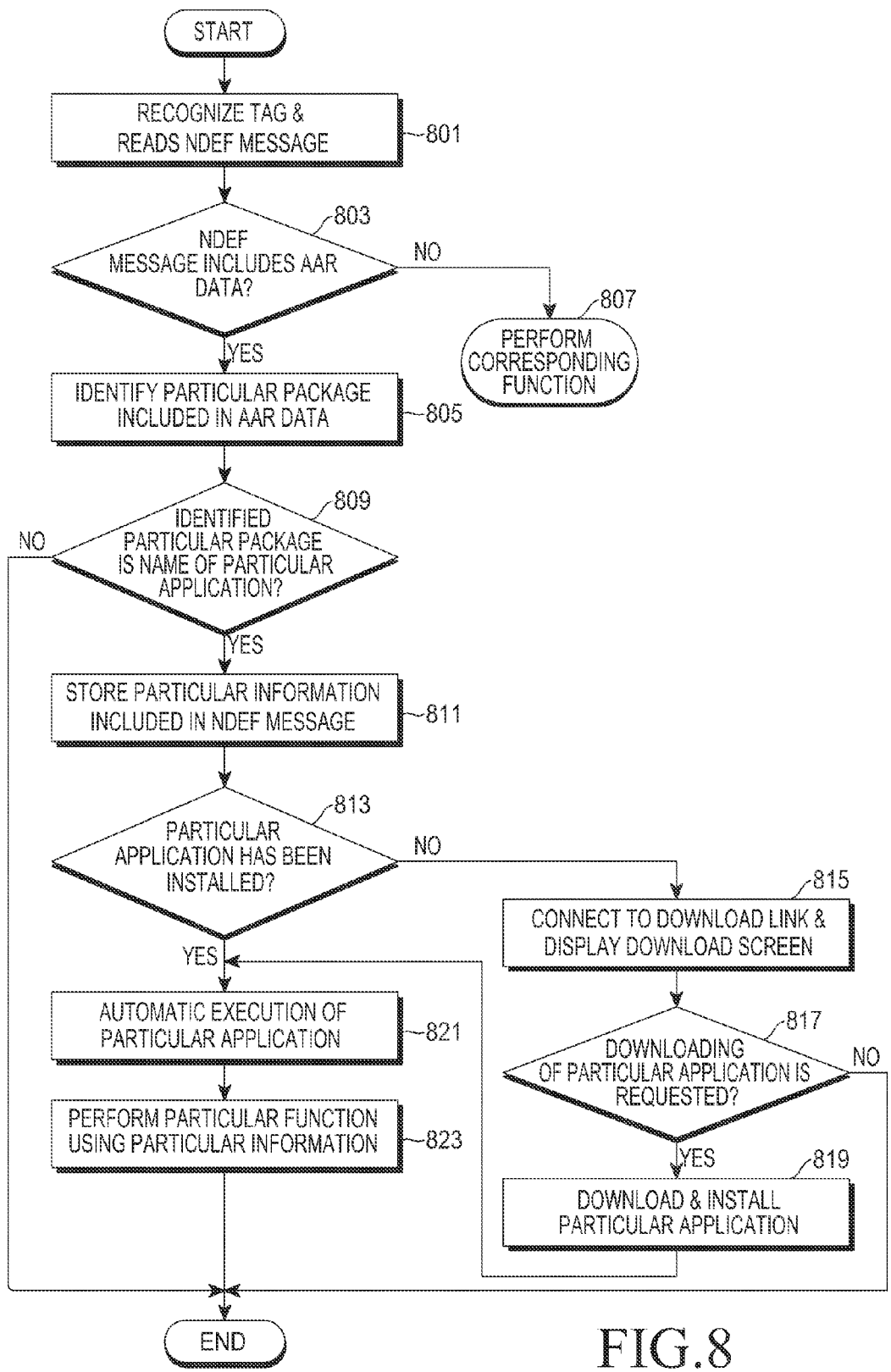
FIG. 8 illustrates a flowchart of a process of providing an NFC function by a portable terminal according to a second exemplary embodiment of the present invention.

FIG. 8 illustrates a flowchart of a process of providing an NFC function by a portable terminal according to the second exemplary embodiment of the present invention.

Referring to FIG. 8, in step 801, the controller 401 recognizes a tag by using the NFC unit 409 and reads an NDEF message from the tag, and proceeds to step 803. In step 803, the controller 401 analyzes the read NDEF message to determine whether the NDEF message includes AAR type data.

As a result of the determination, when the NDEF message does not include AAR type data, the controller 401 proceeds to step 807. Otherwise, the controller 401 proceeds to step 805. In step 807, the controller 401 performs a particular function according to corresponding data included in the NDEF message.

In contrast, in step 805, the controller 401 analyzes the AAR type data to identify a particular package included in the AAR type data, and proceeds to step 809. In step 809, the controller 401 determines whether the identified particular package corresponds to at least one pre-stored particular application name. For example, since the particular application is an application providing the Bluetooth™ function, the particular application name may be stored in advance in the memory 407.

As a result of the determination, when the particular package is a particular application name, the controller 401 proceeds to step 811. Otherwise, the controller 401 terminates the process of providing the NFC function.

In step 811, the controller 401 detects particular information from the NDEF message and stores the detected particular information in the memory 407, and proceeds to step 813. The particular information refers to information relating to the particular application corresponding to the particular package among the data included in the NDEF message. For example, the particular information may be Bluetooth™ (BT) information and the BT information includes a Bluetooth™ address for connection of a Bluetooth™ communication with an external device. In this event, the controller 401 may store particular information in a data area of the memory 407. Further, in step 813, the controller 401 determines whether the particular application corresponding to the particular package has been installed in the portable terminal.

As a result of the determination, when the particular application has not been installed, the controller 401 proceeds to step 815. Otherwise, the controller 401 proceeds to step 821.

In step 815, the controller 401 connects to a download link at which it is possible to download the particular application and displays a download screen, and proceeds to step 817. In step 817, the controller 401 determines whether downloading of the particular application is requested by the user. As a result of the determination, when downloading of the particular application is requested, the controller 401 proceeds to step 819. Otherwise, the controller 401 terminates the process of providing the NFC function.

In step 819, the controller 401 downloads and installs the particular application, and proceeds to step 821. In step 821, the controller 401 automatically executes the particular application, and proceeds to step 823. Further, in step 823, the controller 401 provides stored particular information to the particular application, so as to enable the particular application to perform a particular function by using the stored particular information. For example, when the particular information is BT information, the controller 401 controls to enable the particular application to perform Bluetooth™ communication with an external device supporting the Bluetooth™ communication based on the BT information.

Figure 9A:
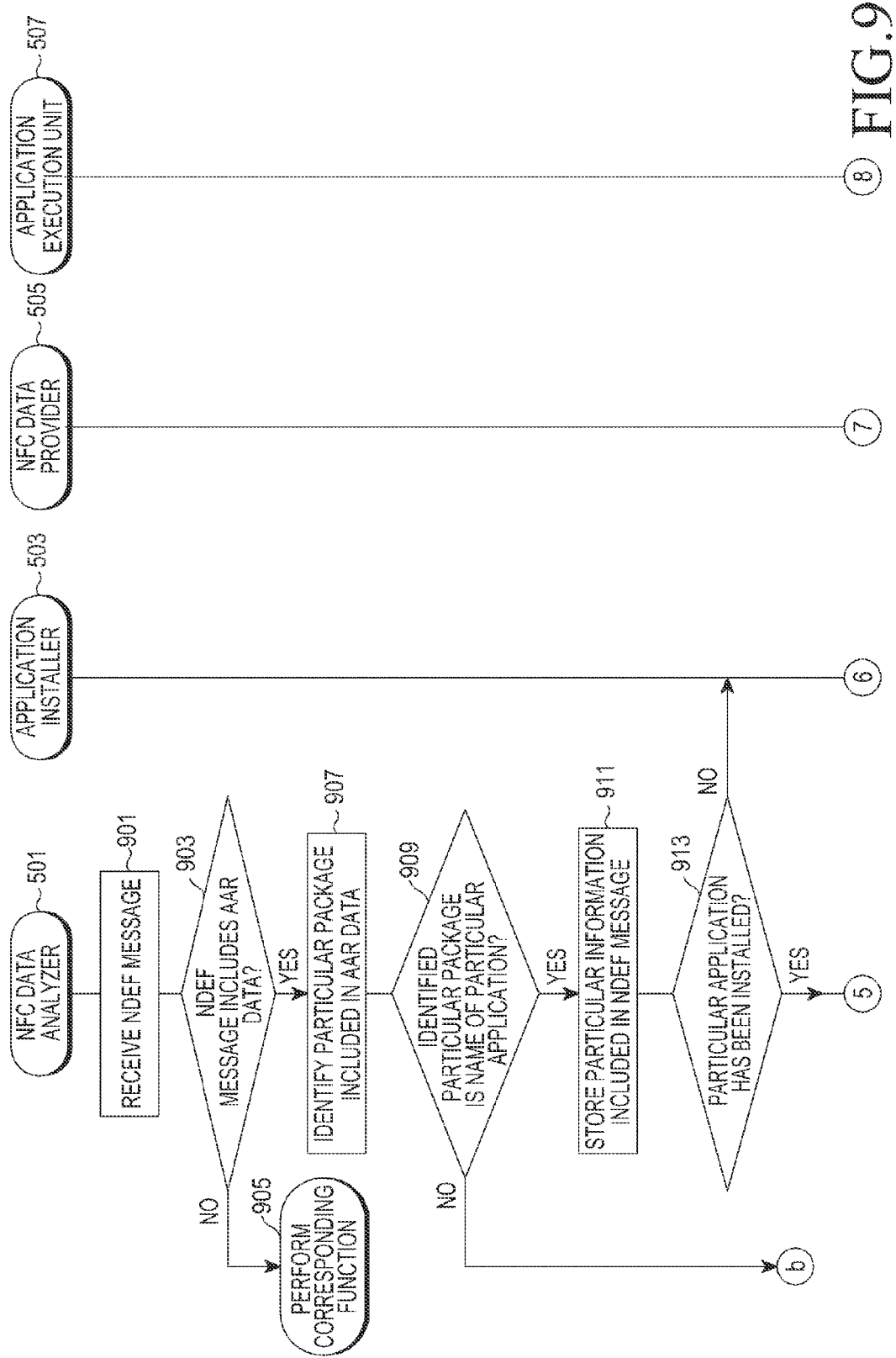
FIGS. 9A and 9B illustrate a flowchart of a process of providing an NFC function by a controller according to the second exemplary embodiment of the present invention.
Figure 9B:
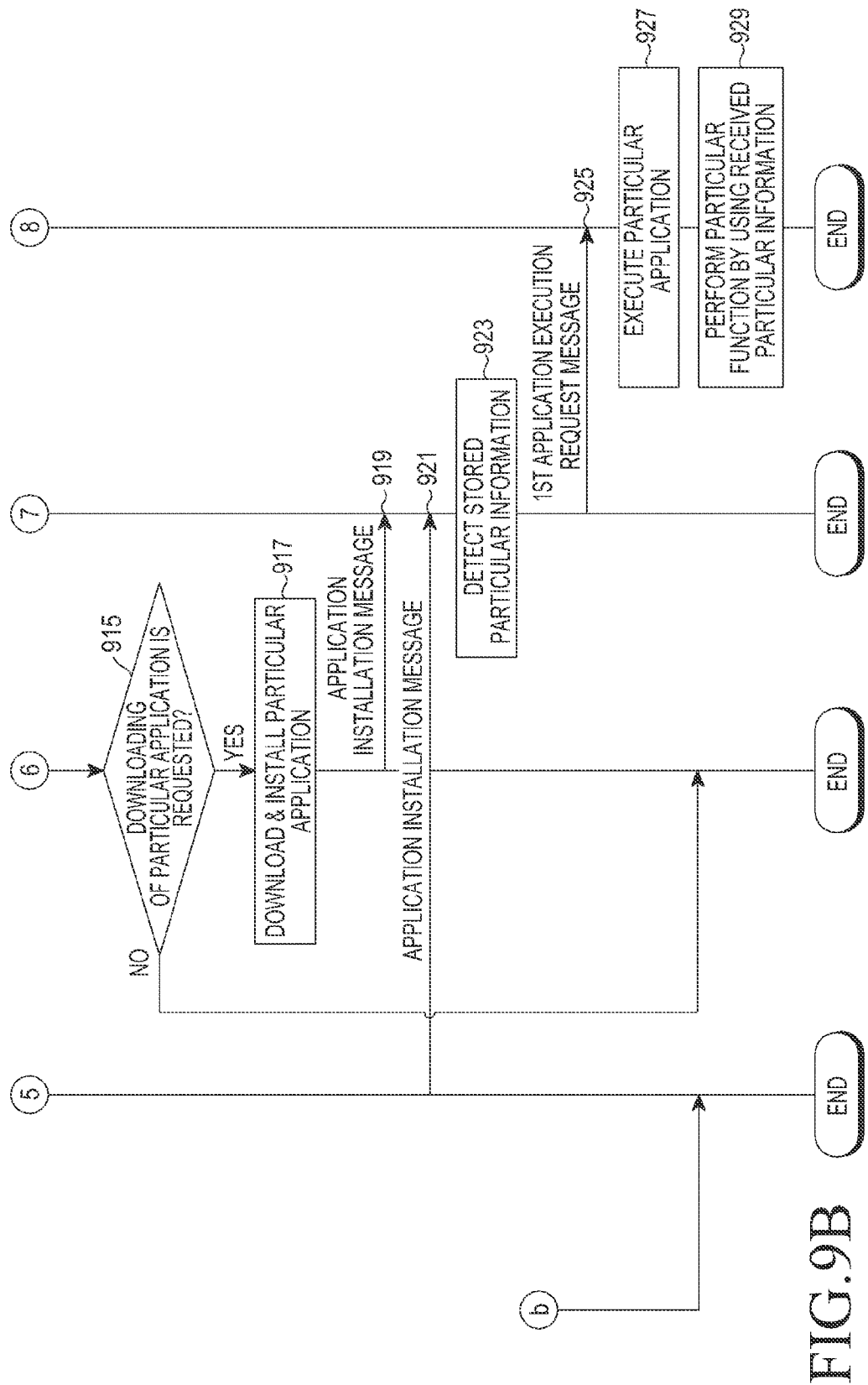

FIGS. 9A and 9B illustrate a flowchart of a process of providing an NFC function by a controller according to the second exemplary embodiment of the present invention.

Referring to FIGS. 9A and 9B, in step 901, the NFC data analyzer 501 receives an NDEF message from the NFC unit 409. Thereafter, in step 903, the NFC data analyzer 501 analyzes the received NDEF message to determine whether the received NDEF message includes AAR type data. As a result of the determination, when the NDEF message does not include AAR type data, the NFC data analyzer 501 proceeds to step 905. Otherwise, the NFC data analyzer 501 proceeds to step 907. In step 905, the NFC data analyzer 501 performs a corresponding function according to data included in the NDEF message.

In contrast, in step 907, the NFC data analyzer 501 analyzes the AAR type data to identify a particular package included in the AAR type data, and proceeds to step 909. In step 909, the NFC data analyzer 501 determines whether the identified particular package corresponds to at least one pre-stored particular application name. The particular application may be an application providing a Bluetooth™ function, and the particular application name may be stored in advance in the memory 407.

As a result of the determination, when the identified particular package is a particular application name, the NFC data analyzer 501 proceeds to step 911. Otherwise, the NFC data analyzer 501 terminates the process of providing the NFC function.

In step 911, the NFC data analyzer 501 detects particular information from the NDEF message and stores the detected particular information in the memory 407, and proceeds to step 913. In step 913, the NFC data analyzer 501 determines whether the particular application corresponding to the particular package has been installed in the portable terminal.

As a result of the determination, when the particular application has not been installed, the NFC data analyzer 501 proceeds to step 915 in order to request the application installer 503 to install the particular application. Otherwise, the NFC data analyzer 501 proceeds to step 921.

In step 921, the NFC data analyzer 501 transmits an application installation message indicating that the particular application has been installed to the NFC data provider 505, and proceeds to step 923.

Further, in step 915, the application installer 503 connects to a download link in which it is possible to download the particular application, and displays a download screen. The application installer 503 determines whether downloading of the particular application is requested by the user. As a result of the determination, when downloading of the particular application is requested by the user, the application installer 503 proceeds to step 917. Otherwise, the application installer 503 terminates the process of providing the NFC function.

In step 917, the application installer 503 downloads and installs the particular application. Thereafter, in step 919, the application installer 503 transmits an application installation message indicating that the particular application has been installed to the NFC data provider 505, and proceeds to step 923.

In step 923, the NFC data provider 505 detects particular information stored in the NFC unit 409, and proceeds to step 925. In step 925, the NFC data provider 505 generates a second application execution request message including a particular package and the stored particular information and transmits the generated second application execution request message to the application execution unit 507, and proceeds to step 927.

In step 927, the application execution unit 507 receives the second application execution request message and executes a particular application corresponding to a particular package included in the received second application execution request message, and proceeds to step 929. Further, in step 919, the application execution unit 507 provides particular information included in the application execution request message to the executed particular application, so as to enable the particular application to perform a particular function by using the provided particular information. For example, when the particular information is BT information, the application execution unit 507 may control to enable the particular application to perform Bluetooth™ communication with an external device supporting the Bluetooth™ communication based on the particular information.

Through the operations described above, exemplary embodiments of the present invention can simultaneously process both AAR type data and different data other than the AAR type data, by one tagging.

A terminal according to an exemplary embodiment of the present invention and a method of generating a live image in the terminal can be implemented as a computer readable code in a computer readable recording medium. The computer readable recoding medium includes all types of recording devices storing data which can be read by a computer system. For example, the recording medium includes a Read Only Memory (ROM), a Random Access Memory (RAM), an optical disk, a magnetic tape, a floppy disk, a hard disk, a non-volatile memory, and the like, and also includes a medium implemented in a form of a carrier wave (for example, transmission through the Internet). Further, the computer readable recoding medium is distributed to the computer system connected through a network, in which a computer readable code may be stored and executed in a distributed manner.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for providing a short range wireless communication function, the apparatus comprising:
   a transceiver configured to recognize a tag and read a message from the tag;
   a memory; and
   at least one processor configured to:
      determine whether first record type data for executing or downloading of a first application exists in the message, the first record type data including a name of the first application,
      when the first record type data exists in the message, compare the name of the first application included in the first record type data with a predetermined name stored in the memory,
      when the name of the first application included in the first record type data matches the predetermined name stored in the memory, store second record type data included in the message in the memory, the second record type data including short range wireless communication address information,
      determine whether the first application corresponding to the first record type data has been installed,
      execute the first application according to the first record type data when the first application has been installed,
      provide the second record type data stored in the memory to the first application so as to enable the first application to execute a first function of connecting according to the short range wireless communication address information stored in the memory, and
      when the first record type data does not exist in the message, execute a second function according to data included in the message,
   wherein the first record type data and the short range wireless communication address information are simultaneously processed.

2. The apparatus of claim 1, wherein, when the first application has not been installed, the at least one processor is further configured to:
   connect to a download link at which it is possible to download the first application and display a download screen according to the first record type data,
   download and install the first application in response to a request for downloading of the first application,
   automatically execute the first application, and
   provide the second record type data stored in the memory to the first application, so as to enable the first application to perform the first function based on the second record type data stored in the memory.

3. The apparatus of claim 1, wherein the first record type data comprises a package including the name of the first application.

4. The apparatus of claim 1, wherein the second record type data is stored in a data area of the memory.

5. The apparatus of claim 1, wherein the at least one processor, when the first application has been installed, is further configured to:
   detect the second record type data, and
   generate a message including a name of the first application and the detected second record type data.

6. The apparatus of claim 5, wherein the at least one processor is further configured to:
   automatically execute the first application corresponding to the name included in the generated message, and
   provide the second record type data to the first application so as to enable the first application to perform the first function based on the second record type data.

7. A method of providing a short range wireless communication function in a portable terminal, the method comprising:
   recognizing a tag and reading a message from the tag;
   determining whether first record type data for executing or downloading of a first application exists in the message, the first record type data including a name of the first application;
   when the first record type data exists in the message, comparing the name of the first application included in the first record type data with a predetermined name stored in a memory of the portable terminal;
   when the name of the first application included in the first record type data matches the predetermined name stored in the memory, storing second record type data included in the message in the memory, the second record type data including short range wireless communication address information;
   determining whether the first application corresponding to the first record type data has been installed;
   when the first application has been installed, executing the first application according to the first record type data and providing the second record type data stored in the memory to the first application so as to enable the first application to execute a first function of connecting according to the short range wireless communication address information; and
   when the first record type data does not exist in the message, executing a second function according to data included in the message,
   wherein the first record type data and the short range wireless communication address information are simultaneously processed.

8. The method of claim 7, further comprising:
   when the first application has not been installed, connecting to a download link at which it is possible to download the first application and displaying a download screen according to the first record type data;

downloading and installing the first application in response to a request for downloading of the first application; and automatically executing the first application, and providing the second record type data to the first application, so as to enable the first application to perform the first function based on the second record type data stored in the memory.

9. The method of claim 7, wherein the first record type data comprises a package including the name of the first application.

10. The method of claim 7, wherein the second record type data is stored in a data area of the memory.

11. The method of claim 7, wherein the providing of the second record type data comprises:

detecting the second record type data when the first application has been installed; and generating and transmitting a message including the name of the first application and the detected second record type data.

12. The method of claim 11, wherein the providing of the second record type data comprises:

automatically executing the first application corresponding to the name of the first application included in the message; and providing the second record type data to the first application, so as to enable the first application to perform the first function based on the second record type data.

13. An apparatus for providing a short range wireless communication function, the apparatus comprising:

a transceiver configured to recognize a tag and read a message from the tag;

a memory configured to store information; and at least one processor configured to:

determine whether first record type data for executing or downloading of at least one first application exists in the message, the first record type data including a name of the at least one first application, when the first record type data exists in the message, compare the name of the at least one first application included in the first record type data with a predetermined name stored in the memory, when the name of the first application included in the first record type data matches the predetermined name stored in the memory, detect information associated with the at least one first application from the message, the detected information including short range wireless communication address information, store the detected information in the memory according to the first record type data, execute the at least one first application, provide the detected information stored in the memory to the at least one first application so as to enable the at least one first application to execute a first function of connecting according to the short range wireless communication address information stored in the memory, and when the first record type data does not exist in the message, execute a second function according to data included in the message, wherein a record type of the detected information is different from the first record type, and wherein the first record type data and the short range wireless communication address information are simultaneously processed.

14. The apparatus of claim 13, wherein the at least one first application is an application supporting a Bluetooth™ function.

15. The apparatus of claim 13, wherein the detected information is Bluetooth™ information comprising a Bluetooth™ address for establishment of Bluetooth™ communication.

16. The apparatus of claim 13, wherein the at least one processor, when the at least one first application has been installed, is further configured to:

detect the information, and generate a message including a name of the at least one first application and the detected information.

17. The apparatus of claim 16, wherein the at least one processor is further configured to:

automatically execute the at least one first application corresponding to the name included in the generated message, and provide the detected information to the at least one first application, so as to enable the at least one first application to perform the first function based on the detected information stored in the memory.

18. A method of providing a short range wireless communication function in a portable terminal, the method comprising:

recognizing a tag and reading a message from the tag;

determining whether first record type data for executing or downloading of at least one first application exists in the message, the first record type data including a name of the at least one first application;

when the first record type data exists in the message, comparing the name of the at least one first application included in the first record type data with a predetermined name stored in a memory of the portable terminal;

when the name of the at least one first application included in the first record type data matches the predetermined name stored in the memory, detecting information associated with the at least one first application from the message, the detected information including short range wireless communication address information;

storing the detected information in the memory according to the first record type data;

executing the at least one first application;

providing the detected information stored in the memory to the at least one first application so as to enable the at least one first application to execute a first function of connecting according to the short range wireless communication address information stored in the memory; and when the first record type data does not exist in the message, executing a second function according to data included in the message, wherein a record type of the detected information is different from the first record type, and wherein the first record type data and the short range wireless communication address information are simultaneously processed.

19. The method of claim 18, wherein the at least one first application is an application supporting a Bluetooth™ function.

20. The method of claim 18, wherein the detected information is Bluetooth™ information comprising a Bluetooth™ address for establishment of Bluetooth™ communication.

21. The method of claim 18, wherein the providing of the detected information stored in the memory comprises:
   when the at least one first application has been installed, detecting the information; and
   generating and transmitting a message including the name of the at least one first application and the detected information.

22. The method of claim 21, wherein the providing of the detected information comprises:
   automatically executing the at least one first application corresponding to the name of the at least one first application included in the message; and
   providing the detected information stored in the memory to the at least one first application, so as to enable the at least one first application to perform the first function based on the detected information stored in the memory.

* * * * *